US007191700B2

(12) United States Patent
Sasaki

(10) Patent No.: US 7,191,700 B2
(45) Date of Patent: Mar. 20, 2007

(54) SOLID-LIQUID SEPARATOR

(75) Inventor: Masayoshi Sasaki, Yokohama (JP)

(73) Assignee: Amukon Kabushikikaisha, Yokohama (JP)

( * ) Notice: Subject to any disclaimer, the term of this patent is extended or adjusted under 35 U.S.C. 154(b) by 69 days.

(21) Appl. No.: 11/054,827

(22) Filed: Feb. 9, 2005

(65) Prior Publication Data

US 2005/0193902 A1 Sep. 8, 2005

(30) Foreign Application Priority Data

Feb. 9, 2004 (JP) ............................ 2004-031583

(51) Int. Cl.
*B30B 9/16* (2006.01)
*B01D 35/00* (2006.01)

(52) U.S. Cl. ...................... 100/117; 100/128; 100/146; 210/415; 366/301

(58) Field of Classification Search ................ 100/117, 100/126, 127, 128, 129, 145, 146, 147, 148, 100/149, 150, 338; 210/413, 414, 415; 366/83, 366/84, 85, 97, 147, 300, 301; 241/260.1
See application file for complete search history.

(56) References Cited

U.S. PATENT DOCUMENTS 4,467,717 A 8/1984 Yamamoto
5,333,556 A * 8/1994 Isobe et al. ................. 100/338
5,380,436 A 1/1995 Sasaki
5,752,770 A * 5/1998 Kawaguchi et al. .......... 366/85

FOREIGN PATENT DOCUMENTS

| | | |
|---|---|---|
| EP | 0 581 965 | 2/1994 |
| JP | 63 013698 | 1/1988 |
| JP | 02-251397 | 10/1990 |
| JP | 02-268805 | 11/1990 |
| JP | 7-10440 | 2/1995 |
| JP | 2000 135595 | 5/2000 |
| JP | 2001-224913 | 8/2001 |

OTHER PUBLICATIONS

U.S. Appl. No. 11/081,469, filed Mar. 16, 2005, Sasaki.
Feb. 1, 2003 Journal of Water and Waste Vol. 45, No. 2 p. 9.

* cited by examiner

*Primary Examiner*—Lowell A. Larson
*Assistant Examiner*—Jimmy Nguyen
(74) *Attorney, Agent, or Firm*—Jordan and Hamburg LLP

(57) ABSTRACT

A system is provided with a solid-liquid separator which can transport sludge and other material for treatment without clogging and can efficiently separator liquid from such material for treatment. The system includes movable plates and fixed plates alternatingly disposed and two screws disposed in holes formed in the movable plates and fixed plates. The screws have blades that partially overlap. As the two screws rotate, the material for treatment is transported and the effluent is discharged through the gaps between the movable plates and fixed plates.

4 Claims, 16 Drawing Sheets

SOLID-LIQUID SEPARATOR

BACKGROUND OF THE INVENTION

The present invention relates to a solid-liquid separator for separating liquid from a material for treatment that contains a large volume of liquid.

Solid-liquid separators that separate liquid from a material for treatment containing a large volume of liquid are commonly known and described in, for example, JP 7-10440. Material treated by such a solid-liquid separator include, for example, organic sludge such as wastewater from food processing, sewage, or wastewater from pig farms; inorganic sludge such as cutting lubricant containing chips, waste fluid from plating, ink waste fluid, pigment waste fluid and paint waste fluid; or else chopped vegetable scraps and fruit skins, bran, and foodstuff remains.

A conventional solid-liquid separator has a screw that extends through a tubular body, material for treatment that has flowed into the tubular body from an inlet opening on one end in the axial direction of the tubular body is transported by the rotating screw; the liquid separated from the material at this time, that is, the effluent, is discharged from the effluent discharge gaps in the tubular body, and the material from which the liquid portion has been reduced is discharged through the outlet opening at the other end in the axial direction of the tubular body.

However, with such a conventional solid-liquid separator, when a material that can easily lose its fluidity is subject to dewatering, such material, having undergone liquid separation within a tubular body, has reduced fluidity, and adheres to the surface of the screw and begins to rotate unitarily with the screw. If this happens, the material is not transported by the screw, and there is the danger that the tubular body interior will become clogged. Particularly in the case of inorganic sludge and chopped vegetables scraps, fruit rinds, or bran and foodstuff remains, the tubular body interior can easily become clogged.

BRIEF SUMMARY OF THE INVENTION

The object of the present invention is to provide a solid-liquid separator that can eliminate, or else effectively minimize, the above-described drawbacks to the conventional art.

The present invention, in order to achieve the above-described object, proposes a solid-liquid separator having a plurality of moving plates and two screws that extend through holes formed on these movable plates, each screw having a blade, wherein the two screws are disposed in a state where the blades thereof overlap in part, and the spinning directions of the blades of the screws and the rotation directions of the screws are set so that the material for treatment is all transported in the same direction, and the hole in the movable plates is set to have a size such that the movable plates are pushed and moved by the rotating blades of the two screws.

Further, it would be advantageous for the solid-liquid separator according to a first aspect of the invention to have a plurality of fixed plates, with at least one movable plate disposed between adjacent fixed plates, and to be constituted so that the two screws extend through holes formed in the fixed plates and holes formed in the movable plates.

Further, it would be advantageous for the solid-liquid separator according to either the first or a second aspect of the invention to be constituted so that the holes in the movable plates are such that two circles of roughly equal diameter are disposed so as to overlap in part, and when two common tangents are drawn with respect to these circles, an elongated hole is defined by these two common tangents and the two arcs on the side opposite the side where the two circles overlap, and the outer diameter of the screws is set to be smaller than the diameter of the circles, and the distance between the centers of the two circles is set to be smaller than the distance between the central axes of the two screw.

Further, it would be advantageous for the solid-liquid separator according to a third aspect of the invention to be constituted so that the holes of the fixed plate are formed in a roughly gourd-like shape defined by two circles disposed, in a state of partial overlap, so as to be respectively concentric with the center axes of the screws, and the diameter of each circle is set to be roughly equal to the diameters of the circles defining the holes of the movable plates.

In accordance with the present invention, clogging caused by the material being treated can be prevented, and solid-liquid separation of the material being treated can be performed efficiently.

BRIEF DESCRIPTION OF THE DRAWINGS

Embodiments of the present invention shall be explained in detail with reference to the drawings, in which.

DETAILED DESCRIPTION OF THE INVENTION

Figure 1:
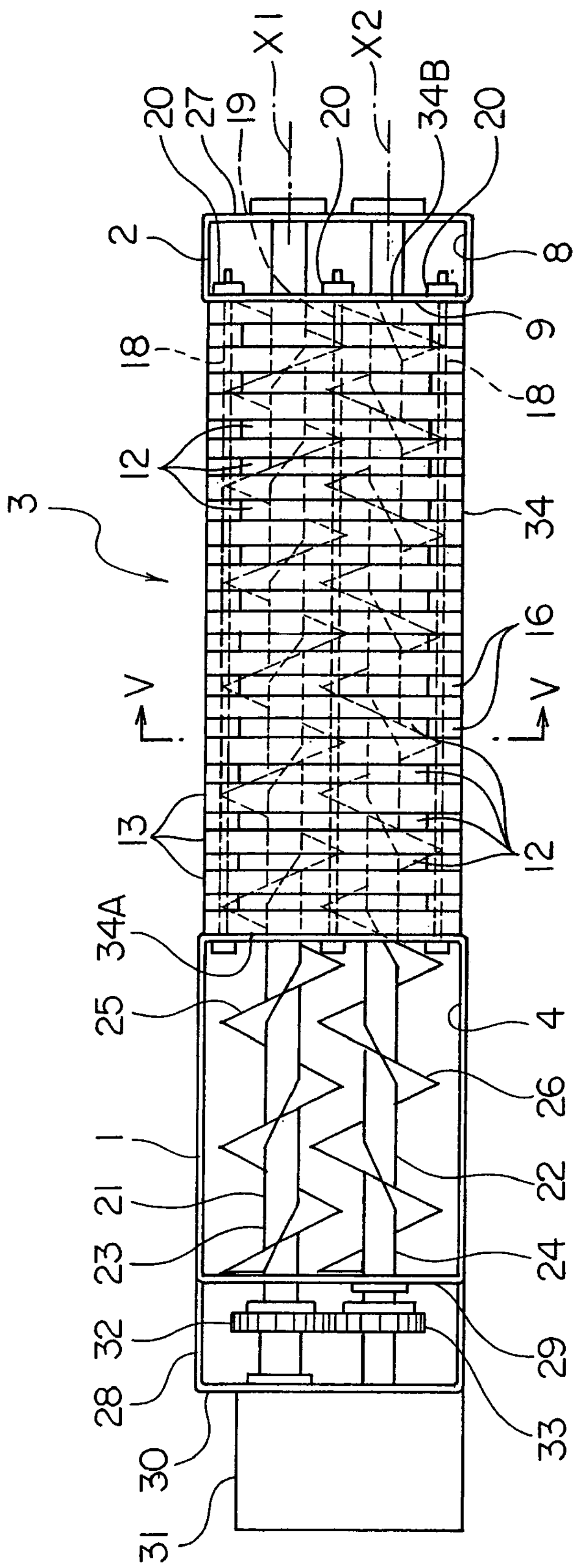
FIG. 1 is a plan view of a solid-liquid separator.
Figure 2:
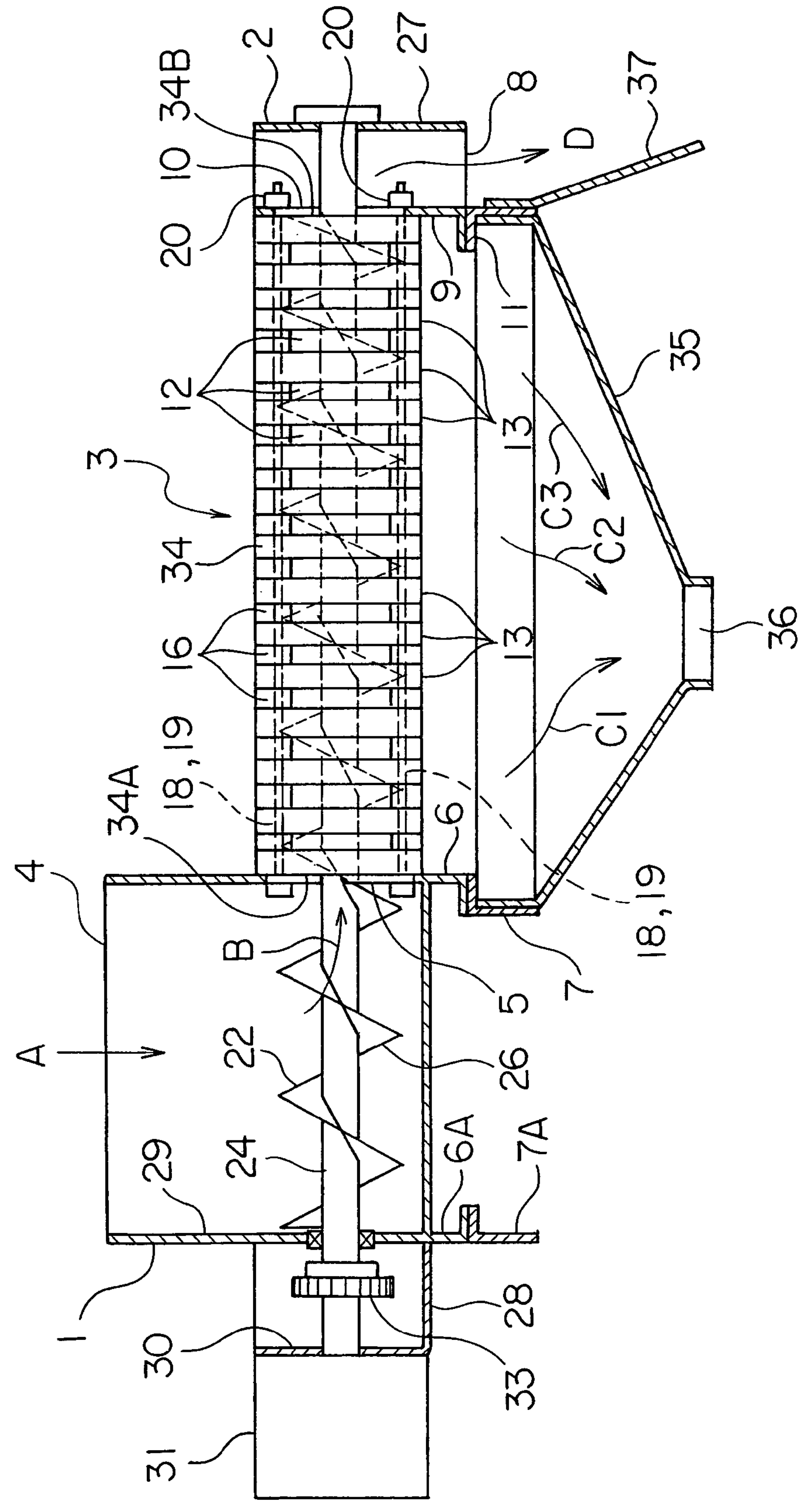
FIG. 2 is a partial cross-sectional front view of the solid-liquid separator shown in FIG. 1.

FIG. 1 is a plan view showing a solid-liquid separator, and FIG. 2 is a partial cross-sectional frontal view of that solid-liquid separator. With such a solid-liquid separator, any of the materials for treatment described above as well as other material can undergo solid-liquid separation; here, an explanation will be given for the dewatering of sludge containing a large volume of water.

The solid-liquid separator showed herein comprises an inlet member 1 and an outlet member 2, and a solid-liquid separator unit 3 is disposed between this inlet member 1 and outlet member 2. The inlet member 1 is formed with a box shape and at the top thereof is formed an inflow opening 4 into which sludge flows; further, an opening 5 is formed on a portion of the inlet member 1 facing the solid-liquid separator unit 3. Lower flanges 6, 6A, which continue from the bottom wall of the inlet member 1, are fixed to stays 7, 7A on the device frame. The outlet member 2 has a horizontal cross-sectional shape that is roughly square, the top and bottom thereof are open, and the bottom opening constitutes a discharge opening 8 from which dewatered sludge is discharged. An opening 10 is formed on the side wall 9 of the outlet member 2 facing the solid-liquid separator unit 3, and the bottom of the side wall 9 is fixed to a stay 11 of the device frame.

Figure 3:
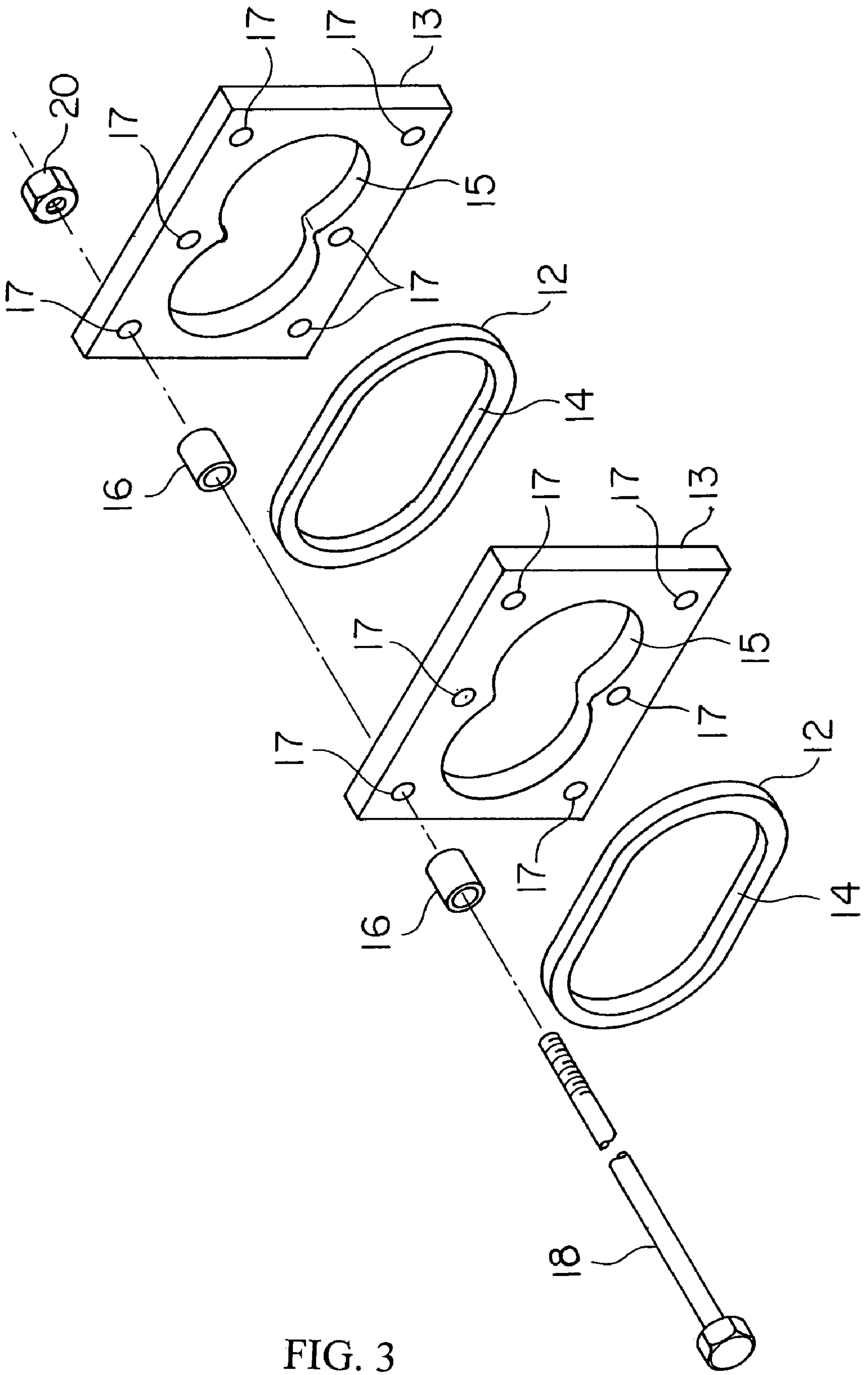
FIG. 3 is an exploded oblique view of a movable plate, fixed plate, spacer, bolt and nut.
Figure 4:
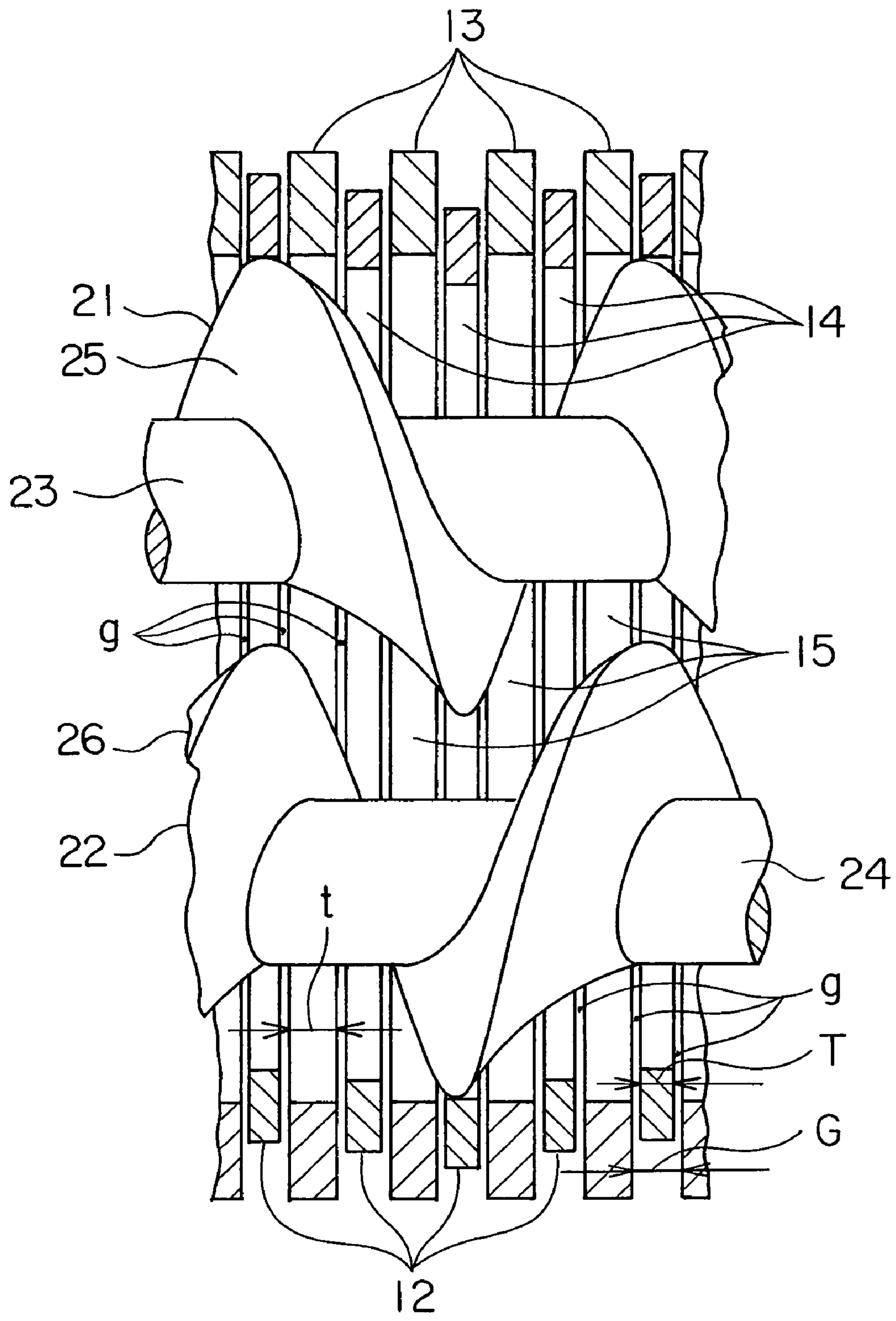
FIG. 4 is an enlarged horizontal cross-sectional view of a solid-liquid separator unit in the solid-liquid separator shown in FIG. 1.

The solid-liquid separator unit 3 according to this embodiment comprises a plurality of movable plates 12 and a plurality of fixed plates 13; in each movable plate 12 and fixed plate 13, hole 14 and 15 is respectively formed, as shown in FIGS. 3 and 4. These holes 14 and 15 may be given any shape that is appropriate, but in the solid-liquid separator according to this embodiment, the hole 14 of the movable plate 12 is an elongated shape, and the hole 15 of the fixed plate 13 is a roughly gourd-like shape.

Figure 5:
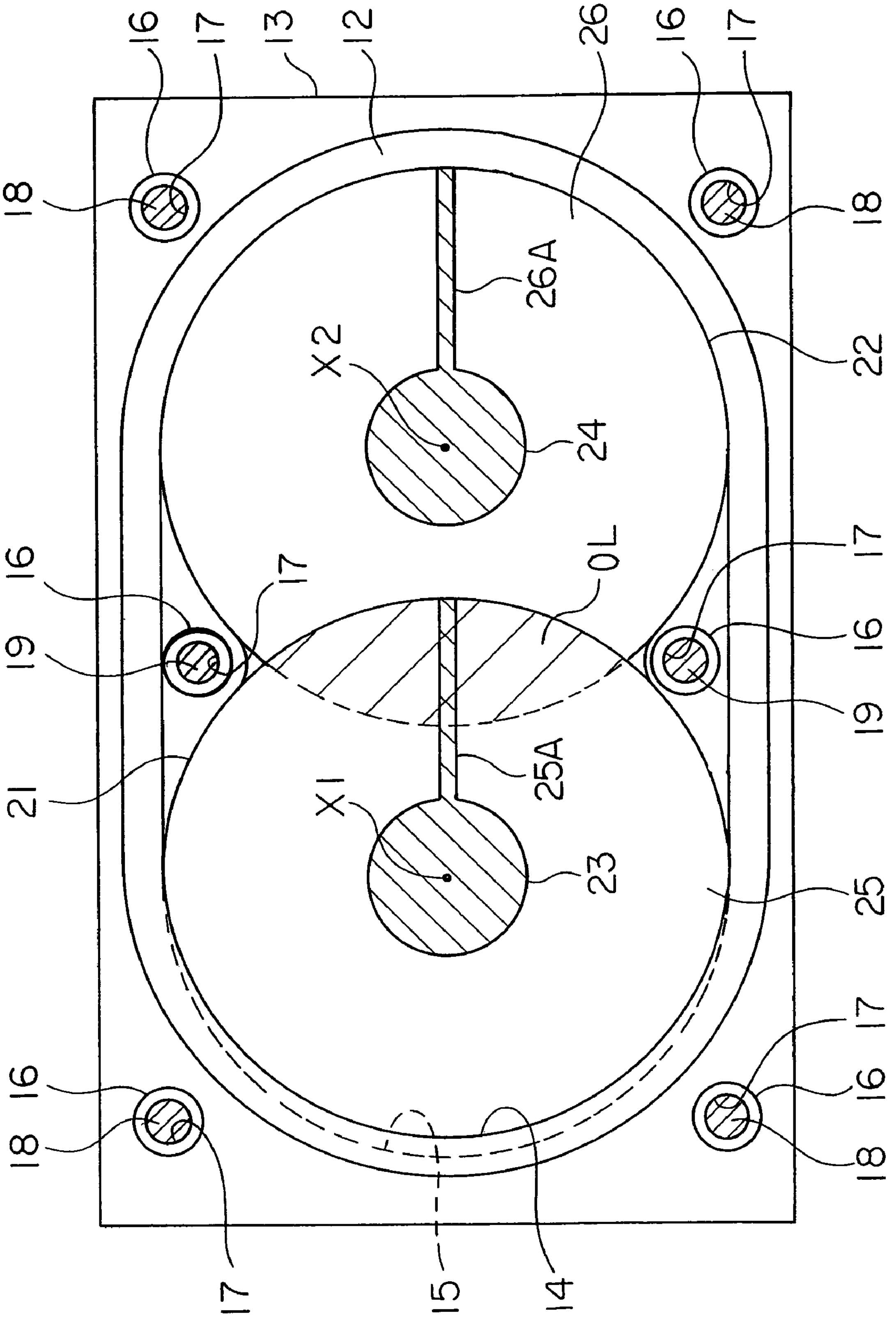
FIG. 5 is an expanded cross-sectional view along the V—V line in FIG. 1.

FIG. 5 is an expanded cross-sectional view along the line V—V of FIG. 1; as shown in FIG. 5, as well as FIGS. 1 through 3, a ring-shaped spacer 16 is disposed between fixed plates 13, and bolts 18, 19 pass through this spacer 16 and attachment holes 17 formed on the fixed plate 13. In this embodiment, four bolts 18 pass through the attachment holes 17 formed in the four corners of the fixed plate 13, and two bolts 19 pass through the two attachment holes 17 formed in the center portion of the fixed plate 13, making a total of six bolts used. FIG. 3 shows only a single bolt 18 and spacer 16 engaging therewith.

As shown in FIGS. 1 and 2, the bolts 18 and 19 pass through the inlet member 1 and the side wall 9 of the outlet member 2, and these bolts 18 and 19 are tightened by screwing on nuts 20. In this way, the fixed plates 13 have prescribed gaps therebetween due to the spacers 16, are arrayed in the axial direction, and are joined together as an integral body and fixed to the inlet member 1 and the outlet member 2 by the bolts 18 and 19 and the nuts 20.

The movable plates 12 are disposed in the gaps between fixed plates 13, and as shown in FIG. 4, the thickness T of a movable plate 12 is set to be smaller than a gap width G between two fixed plates 13, and an effluent discharge gap g, having a thickness of, for example, 0.5 to 1.0 mm, is formed between an end surface of each fixed plate 13 and an end surface of the opposing movable plate 12. This effluent discharge gap g allows fluid separated from sludge in the manner described below—that is, effluent—to pass through. The thickness T of the movable plate 12 is set, for example, at 1.5 mm, and the thickness t of the fixed plate 13 is set, for example, at 5 mm.

Further, the four bolts 18 extending through the four corners of the fixed plate 13, as shown in FIG. 5, are disposed beyond the movable plates 12, and the other two bolts, i.e., bolts 19, pass within the movable plates 12. Each movable plate 12 is caught on the respective spacer 16 engaging with the upper bolt 19, thus keeping the movable plates 12 from falling downward, and the movable plates 12 can, within the space between the fixed plates 13, move in a direction parallel with the end faces of the fixed plates 13.

Further, the solid-liquid separator has two screws 21, 22; these two screws 21, 22 pass through the holes 15 formed in the fixed plates 13 and the holes 14 formed in the movable plates 12. The screws 21, 22 described herein have shafts 23, 24 and spiral blades 25, 26 integral with such shafts 23, 24. As shown in FIGS. 1 and 2, one tip of the shafts 23, 24 is rotatably supported on a side wall 27 of the outlet member 2 via a bearing. Further, the inlet member 1 has a gearbox 28 fixed thereto, and the other end of the one screw 21 passes through the side wall 29 of the inlet member 1, and is rotatably supported on a side wall 30 of the gearbox 28 via a bearing. The other end of the other screw 22 passes through the sidewall 29 of the inlet member 1 and the sidewall 30 of the gearbox 28, and is connected to a motor 31 fixedly supported on the gearbox 28. Gears 32, 33 are respectively fixed to the shafts 23 and 24, and these gears 32, 33 engage with each other within the gearbox 28.

Figure 6:
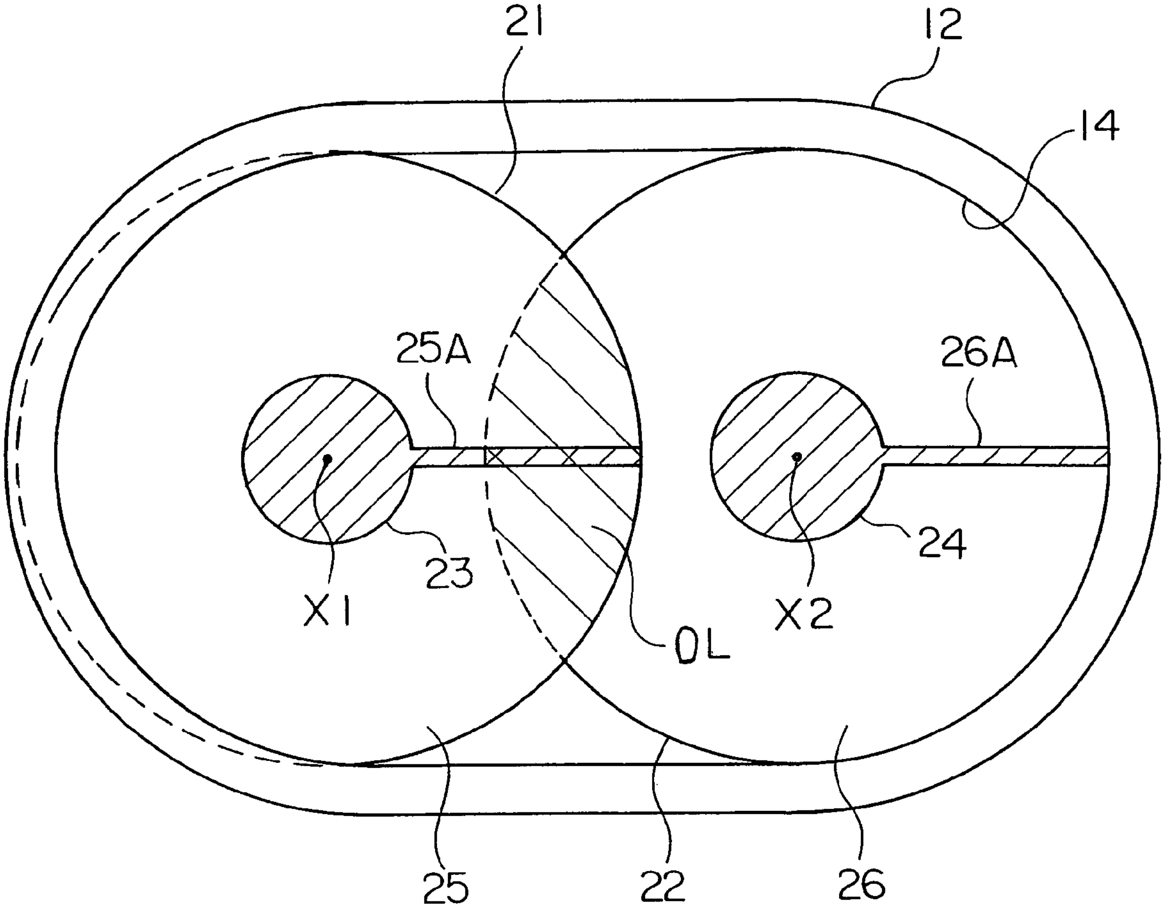
FIG. 6 is a partial cross-sectional view showing the positional relationship between the screws and the movable plate.

FIG. 6 is a partial cross-sectional view showing the relative positioning of the screws 21, 22 and the movable plates 12. As shown in this FIG. 6, as well as in FIGS. 4 and 5, the screws 21, 22 are disposed parallel to each other, in a state where the blades 25, 26 overlap in part, without contact. More specifically, when the two screws 21, 22 are seen from the direction of the central axes X1, X2, the blades 25, 26 overlap in part. In FIGS. 5 and 6, the overlapping portion of the blades 25, 26 of the screws 21, 22 is indicated with slanting lines and labeled "OL." Further, in the example shown in the Figures, the two screws 21, 22 are disposed parallel to each other; they may, however, be disposed so that the central axes X1, X2 are slightly angled with respect to each other. The size and shape of the holes 14 and 15 of the movable plate 12 and fixed plate 13 should of course be such that the rotation of the two screws 21, 22 is not impeded.

The pitch of the blades 25, 26 of the screws 21, 22 gradually decreases going from the inlet member 1 toward the outlet member 2.

In the solid-liquid separator of this embodiment as described above, a tubular body 34 (FIGS. 1 and 2) is constituted by a plurality of fixed plates 13 fixed by bolts 18, 19 and nuts 20 and by a plurality of movable plates 12, and two screws 21, 22 pass through the interior of the tubular body 34.

The constitutions of other embodiments will be shown while giving explanation of the operations of the solid-liquid separator.

Sludge containing large amounts of water (not shown in Figure) enters the inlet member 1 from the inflow opening 4 in the direction indicated by the arrow A in FIG. 2. The water content of pre-treatment sludge may be, for example, 99 wt %. A coagulant has been added to the sludge, and the sludge has been flocculated. Some material will not be treated with a coagulant.

At this time, operation of the motor 31 rotates the screw 22, and this rotation is transmitted to the screw 21 via the gears 33, 32, causing the screw 21 to rotate. Thus because the two screws 21, 22 rotate around the central axes X1, X2, sludge that has flowed into the inlet member 1 passes through the opening 5 of the inlet member 1 and from the inlet opening 34A of the tubular body 34 proceeds into the interior of the tubular body 34, in the direction indicated by the arrow B in FIG. 2, and is then transported through the interior of the tubular body 34 toward the outlet member 2. The sludge is transported toward the outlet member 2 through the interiors of the holes 14, 15 of the plurality of alternatingly disposed movable plates 12 and fixed plates 13.

When sludge is transported through the interior of the tubular body 34 as described above, pressure is applied to the sludge, water is separated from the sludge, and that separated water, namely, the effluent, is discharged outside the tubular body via the effluent discharge gaps g (FIG. 4). As indicated by arrows C1, C2, and C3 in FIG. 2, effluent thus discharged is received by a pan 35 fixed to the stays 7, 11 and then discharged downward through a discharge opening 36 of the pan 35. Because this effluent still contains some solids, after water treatment with other sludge, it is again subject to dewatering by the solid-liquid separator.

Water content of the sludge in the tubular body 34 is lowered as described above, and this sludge with lowered water content is discharged from the outlet opening 34B of the tubular body 34, through the opening 10 of the outlet member 2 and into the outlet member 2; then it drains downward, guided by a shooter 37. The water content of sludge thus dewatered is, for example, 80 wt %. As is commonly known, disposing a back pressure plate (not shown in the Figures) against the outlet opening 34B of the tubular body 34 further increases the pressure on the sludge in the tubular body.

Thus sludge, which is one example of a material for treatment, is transported from the inlet opening 34A of the tubular body 34 toward the outlet opening 34B of the tubular body 34 by the rotation of the screws 21, 22. That is, the spinning direction of the blades 25, 26 of the screws 21, 22 and the rotational direction of the screws 21, 22 are set so that the material is all transported in the same direction. When the screws 21, 22 are to be rotated in mutually opposite directions, the blades 25, 26 of the screws 21, 22 are set to spin in opposite directions. When the rotational directions of the screws 21, 22 have been set in the same direction, then the spinning directions of the blades of the screws 21, 22 are set in the same direction. Doing this ensures that the material being treated will be transported in the same direction by the screws 21, 22.

In solid-liquid separator unit 3, when the liquid and solid components of the sludge are being separated, it is unavoidable that a small amount of solid components will become lodged in the effluent discharge gaps g between the movable plates 12 and the fixed plates 13. If this is left untended, the effluent discharge gaps g will become clogged. However, the movable plate 12 of the solid-liquid separator of this embodiment is pushed by the blades 25, 26 of the two rotating screws 21, 22, and the end faces of the movable plates 12 move in concert therewith against the end faces of the opposing fixed plate 13, and this agitating motion efficiently dislodges solid components from the effluent discharge gaps g, preventing the clogging thereof.

Figure 7:
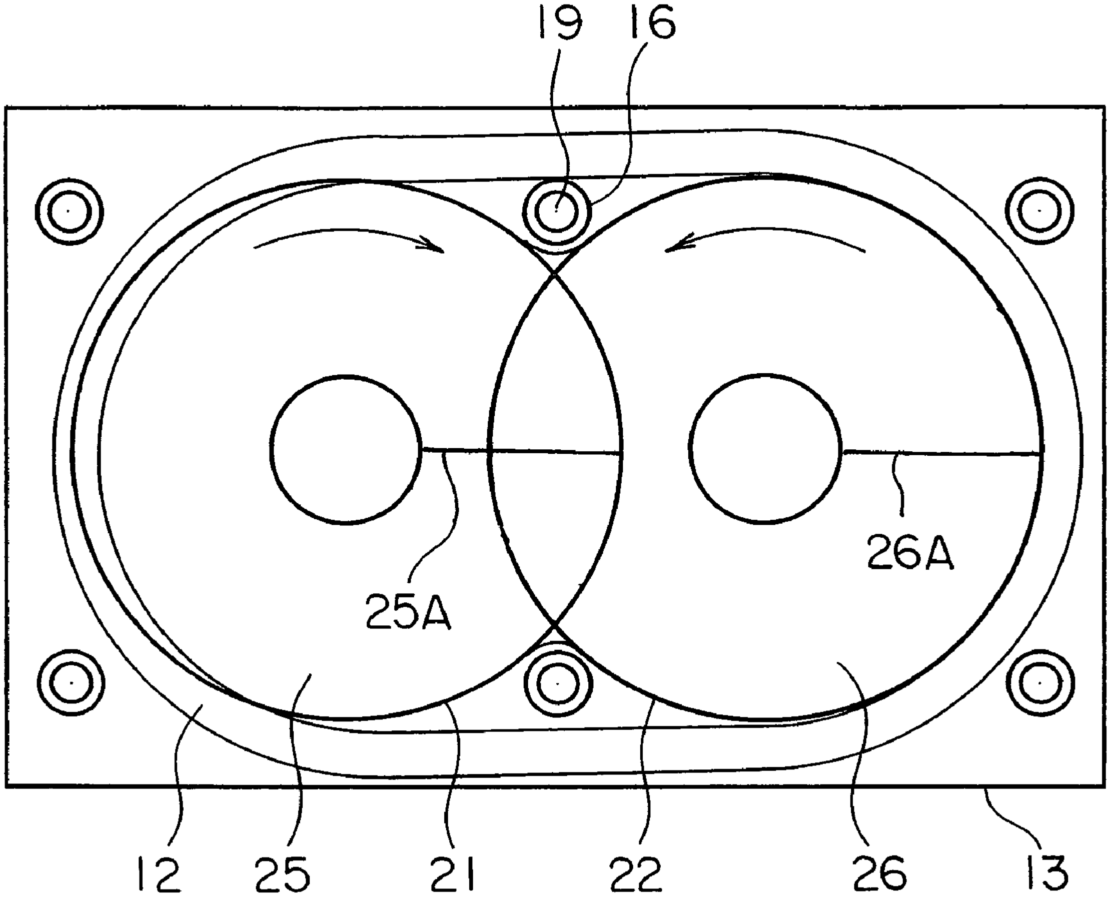
FIG. 7 is a drawing for explaining the movement of the movable plate.
Figure 11:
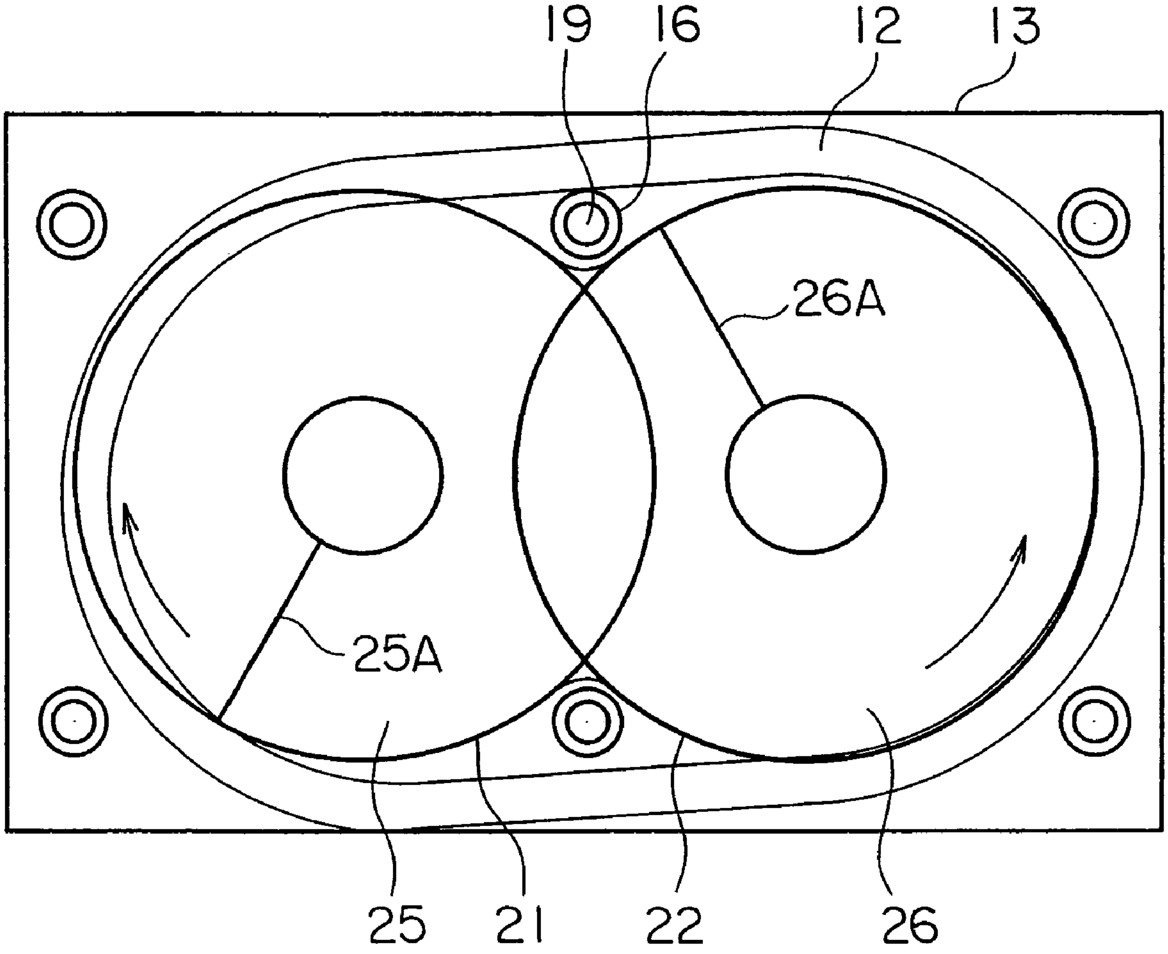
FIG. 11 is a drawing for explaining the movement of the movable plate.
Figure 12:
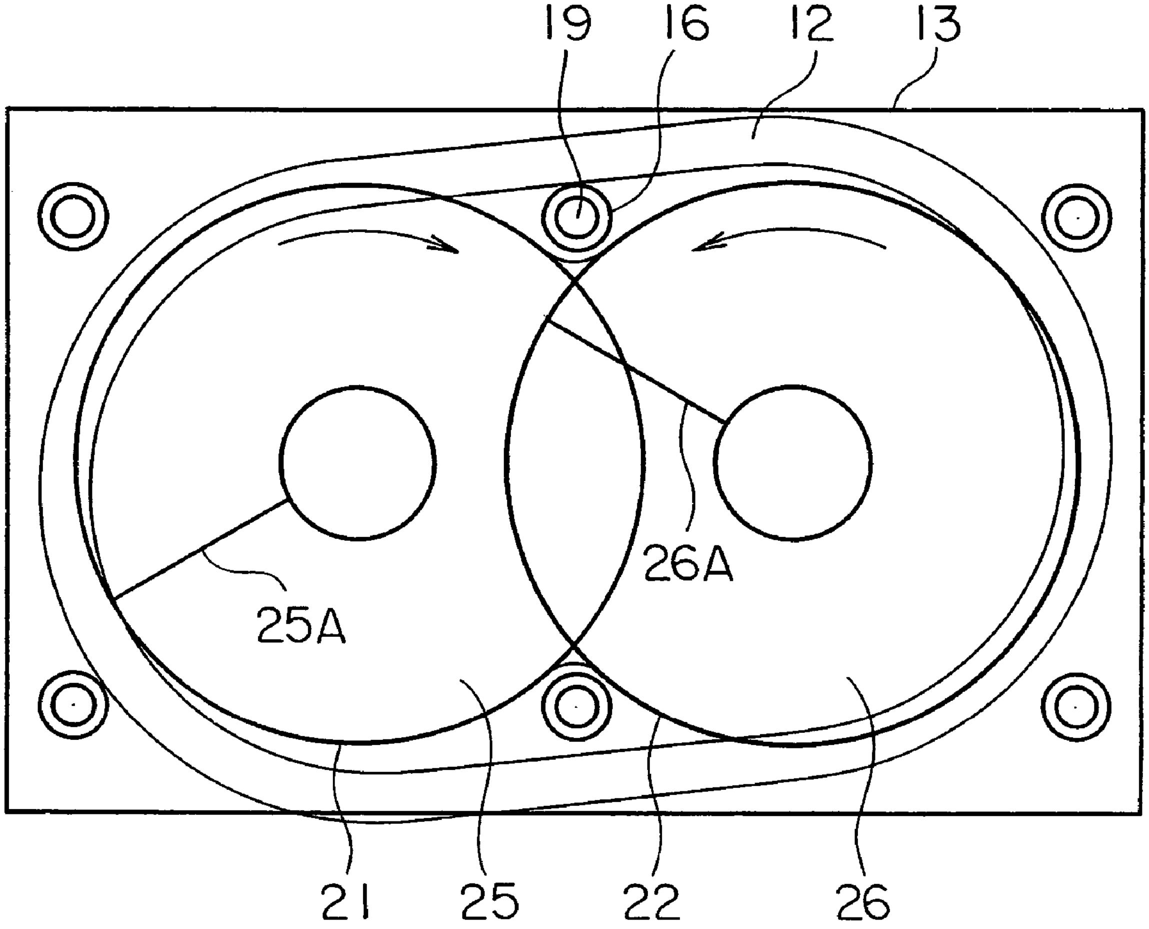
FIG. 12 is a drawing for explaining the movement of the movable plate.
Figure 13:
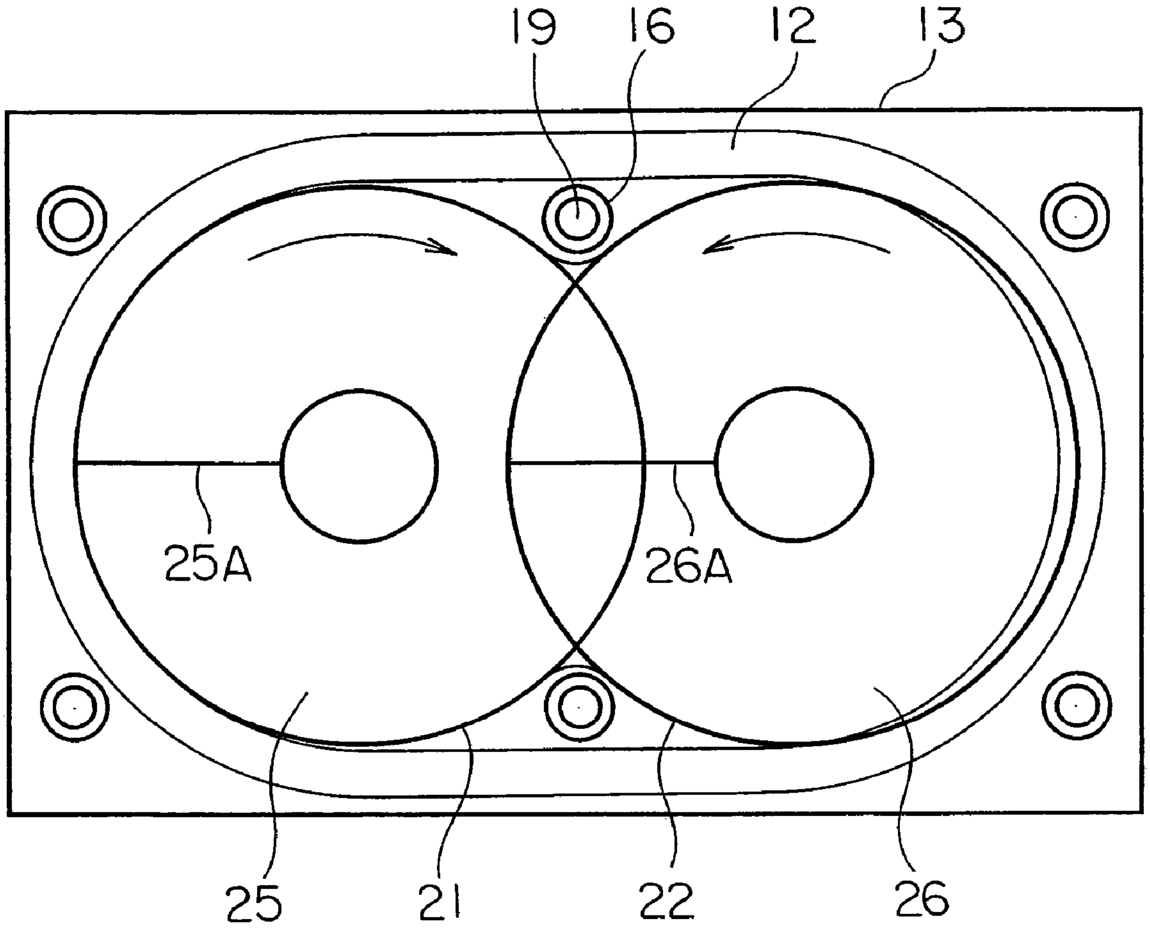
FIG. 13 is a drawing for explaining the movement of the movable plate.

FIGS. 7 through 13 are drawings for schematically explaining conditions when the movable plates 12 are pushed by the two screws 21, 22. In these Figures, the screws 21, 22, the movable plates 12 and the fixed plates 13 are all indicated with solid lines, and the cross-sectional portions of the blades 25, 26 are indicated with lines labeled 25A and 26A (see FIGS. 5 and 6 also). In FIGS. 7 and 13, the one screw 21 is driven so as to rotate in the clockwise direction, and the other screw 22 is driven to rotate in the counterclockwise direction.

If we call the cross-sectional portions 25A, 26A of the blades 25, 26 the blade portions, in the state shown in FIG. 7, the blade portions 25A and 26A both face to the right of the drawing. At this time, one blade portion 25A is not in contact with a movable plate 12, but the other blade portion 26A presses against the movable plate 12 toward the right as seen in the Figures, and the movable plate 12 occupies the rightmost position.

Figure 8:
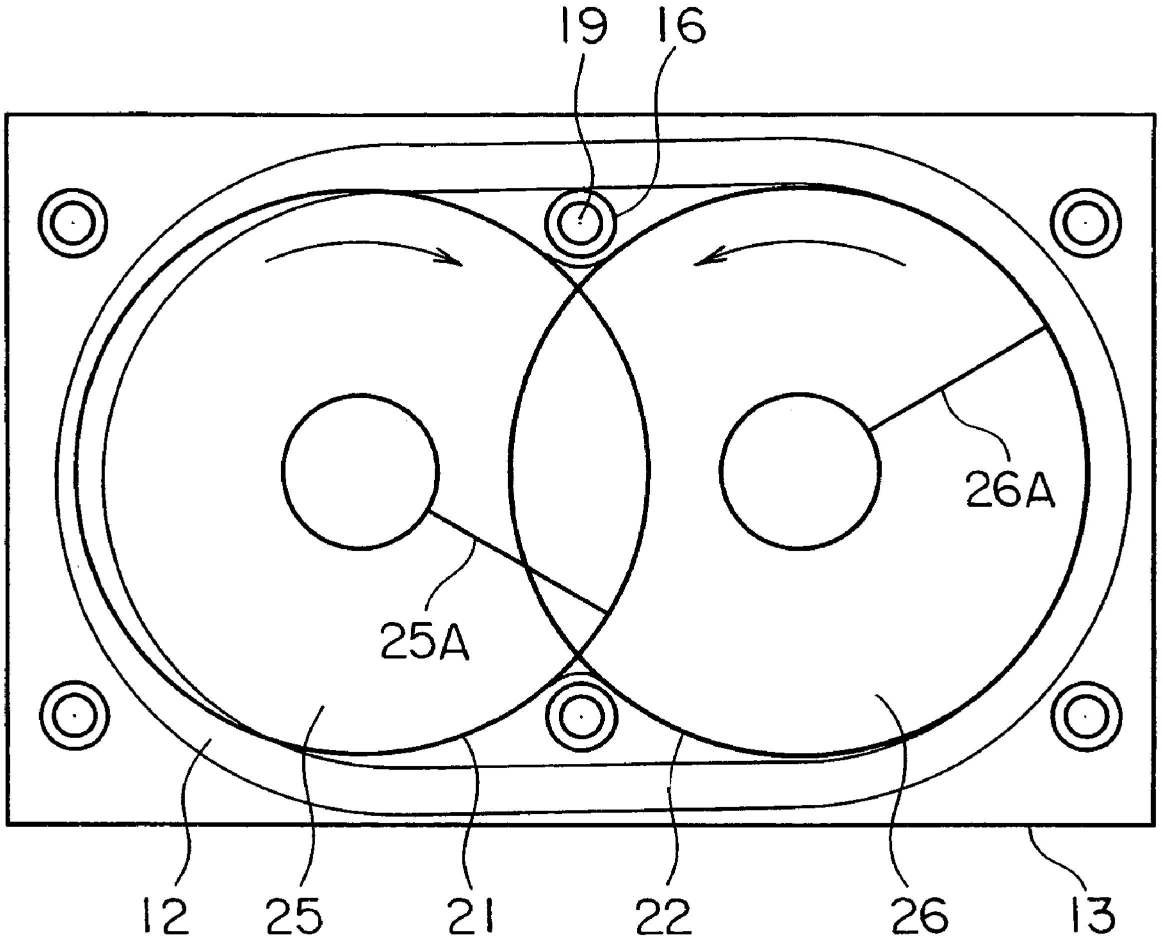
FIG. 8 is a drawing for explaining the movement of the movable plate.
Figure 9:
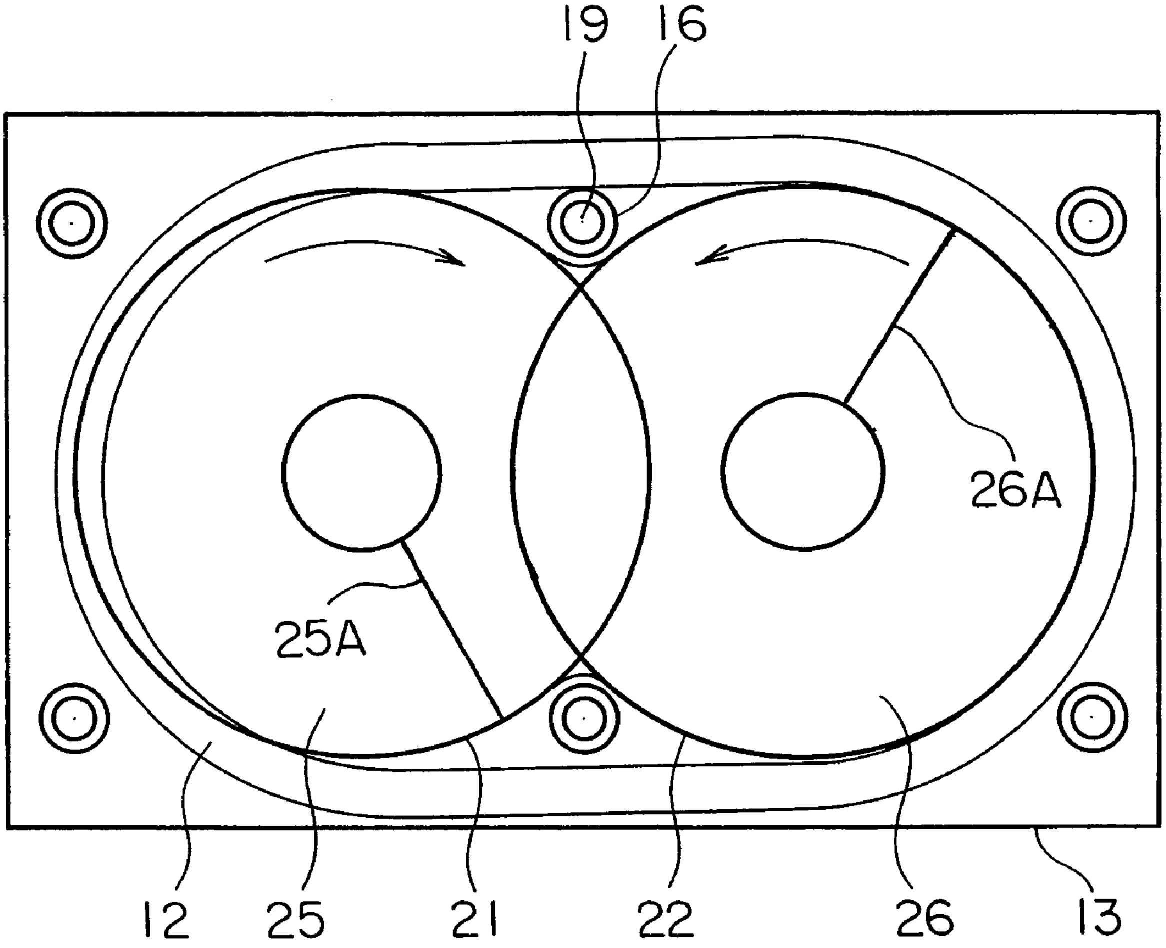
FIG. 9 is a drawing for explaining the movement of the movable plate.
Figure 10:
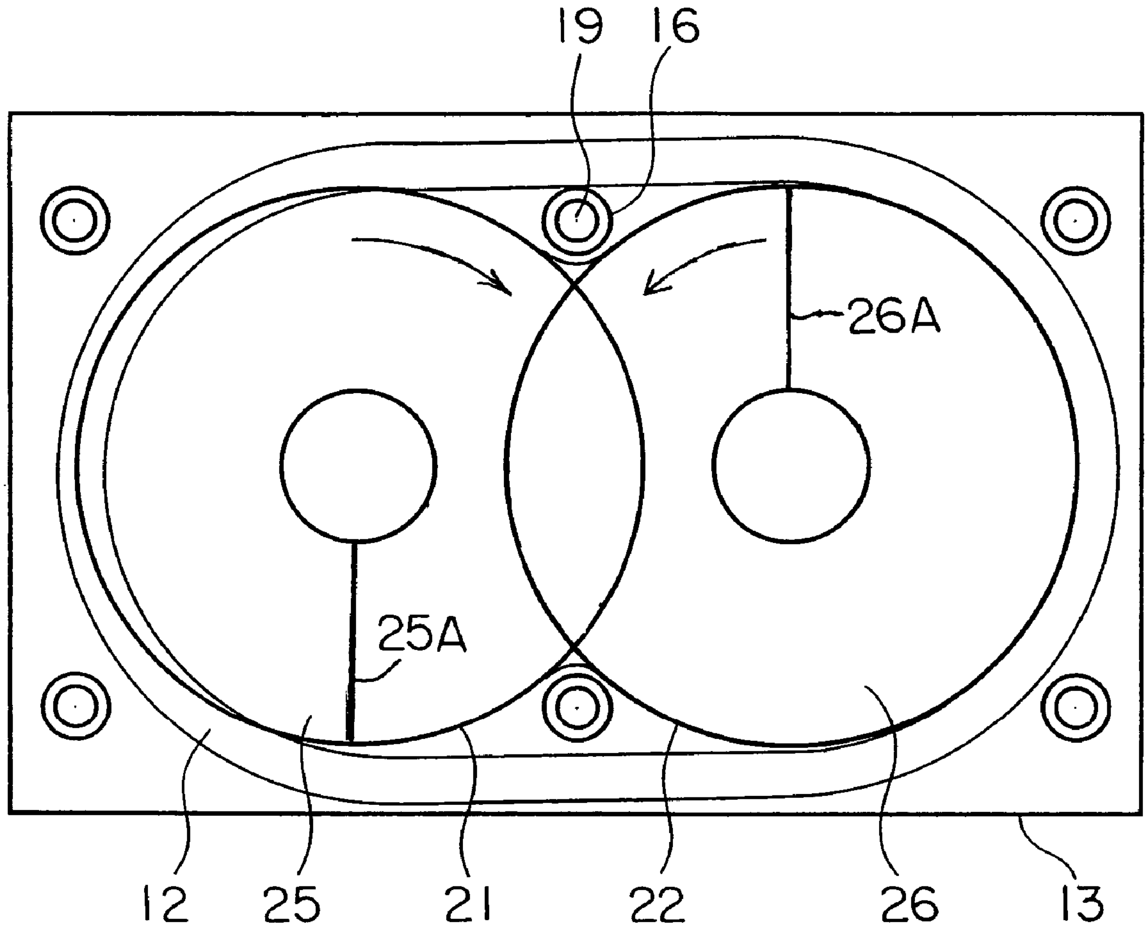
FIG. 10 is a drawing for explaining the movement of the movable plate.

From this state the one screw 21 rotates in the clockwise direction, and the other screw 22 rotates in the counterclockwise direction; when the blade portions 25A, 26A are in the positions shown in FIGS. 8, 9 and 10, the movable plate 12 is pressed by the blade 26A and occupies the rightmost position.

However, when the blade portions 25A, 26A are in the position shown in FIG. 11, the blade portion 26A of the other screw 21 presses the movable plate 12 to the left in the drawing, and the movable plate 12 is pushed toward the left. As shown in FIG. 12, in accordance with the rotation of the screws 21, 22, the movable plate 12 is pushed to the left by the blade portions 25A, 26A, and as shown in FIG. 13, when the blades portions 25A and 26A face to the left in the drawing, the movable plate 12 occupies the leftmost position. The foregoing operation is repeated successively.

As described above, the movable plate 12 maintains a roughly horizontal state as it reciprocatingly moves in the lateral direction in FIGS. 7 through 13. Thus the effluent discharge gaps g between the movable plates 12 and the fixed plates 13 are always being cleaned and the drawback of solid matter getting caught in these gaps and the gaps g becoming clogged, thereby obstructing discharge of the effluent, can be prevented. By setting the size and form of the hole 14 of the movable plate 12 so that the movable plate 12 is pushed by the blades 25, 26 and the screws 21, 22, the above effect can be achieved.

In accordance with the above-described solid-liquid separator, the two screws 21, 22 transport material for treatment through the tubular body 34, and because the blades 25, 26 of the screws 21, 22 partially overlap, even when the material being treated is a substance that easily loses its fluidity, the drawback of having the material clog up the interior of the tubular body 34 is prevented. If dewatering has progressed and a material being treated has lost fluidity and adheres to or is about to adhere to the surfaces of the screws 21, 22, the overlapping portions of the blades 25, 26, as they rotate, scrape away any material that has adhered or is about to adhere to the other screw, breaking up that material and thus preventing the drawbacks of the material clogging up the interior of the tubular body 34. Thus material for treatment that conventionally would clog up the interior of the tubular body 34, such as inorganic sludge and chopped vegetable scraps, fruits rinds, or bran and foodstuff remains, can undergo effective solid-liquid separation.

In particular, with a constitution such that the two screws 21, 22 rotate in mutually opposite directions, the portion where the blades 25, 26 of the screws 21, 22 overlap will forcefully feed a material being treated, and will efficiently transport the material without allowing it to remain behind.

However, as described above, it is necessary to form the hole 14 of the movable plate 12 so that the movable plate 12 is pushed and moved by the blades 25, 26 of the rotating screws 21, 22. FIGS. 5 and 6 show one example of the hole 14 of the movable plate 12, and FIG. 5 shows one example of the hole 15 of the fixed plate 13. The form of these holes 14 and 15 will be explained in greater detail.

Figure 14:
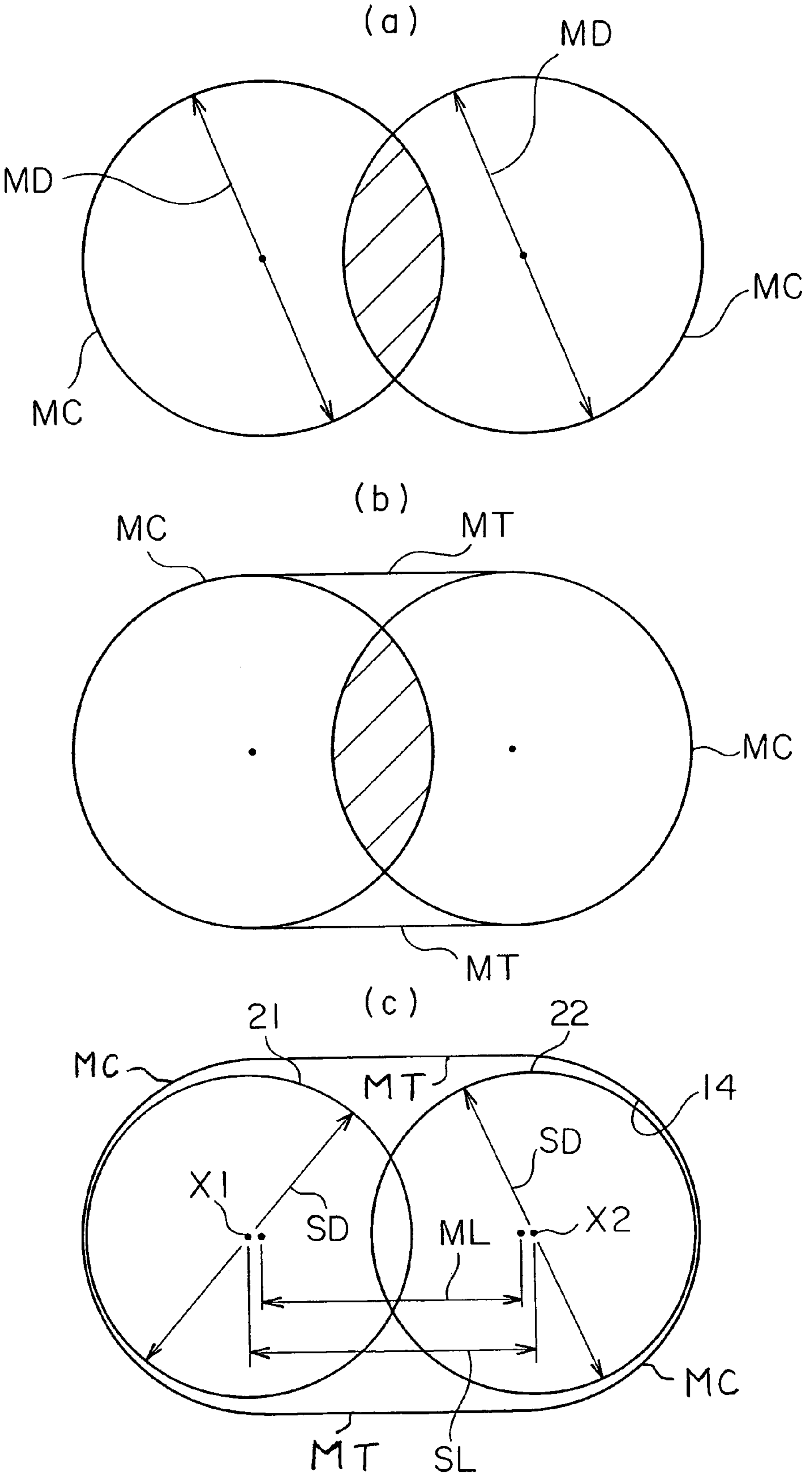
FIG. 14 is a drawing for explaining the shape of the hole of the movable plate.

FIG. 14 is a drawing for explaining specifically the form of the hole 14 of the movable plate 12. First, as shown in FIG. 14(*a*), two circles MC having roughly the same diameter MD are disposed so that they partially overlap. In this drawing the overlapping portion of the two circles MC is shaded. Next, as shown in FIG. 14(*b*), two common tangents MT are drawn with respect to these circles MC. Thus the two common tangents MT and the two arcs opposite the side where the two circles MC overlap describe an elongated hole. This hole will be the hole 14 of the movable plate 12. As shown in FIG. 14(*c*), the outer diameter SD of the screws 21, 22 is smaller than the diameter MD of the circles MC, and the distance ML between the centers of the two circles MC is smaller than the distance SL between the central axes X1, X2 of the screws 21, 22. Therefore, the rotation of the screws 21, 22 is not impeded by the movable plate 12, and the movable plate 12 can be pushed and moved by the rotation of the screws 21, 22 as described above.

The hole 14 of the movable plate 12 and the screws 21, 22 may be constituted to have a different size and shape from that described above; but with the above constitution the movable plate 12 will be reliably pushed and moved by the rotation of the screws 21, 22, and the movable plate 12 can be given a compact size. To describe the movable plate 12 and the screw shown in FIG. 14 in more specific numerical terms, MD=170 mm, ML=121 mm, SD=168 mm, and SL=130 mm.

Figure 15:
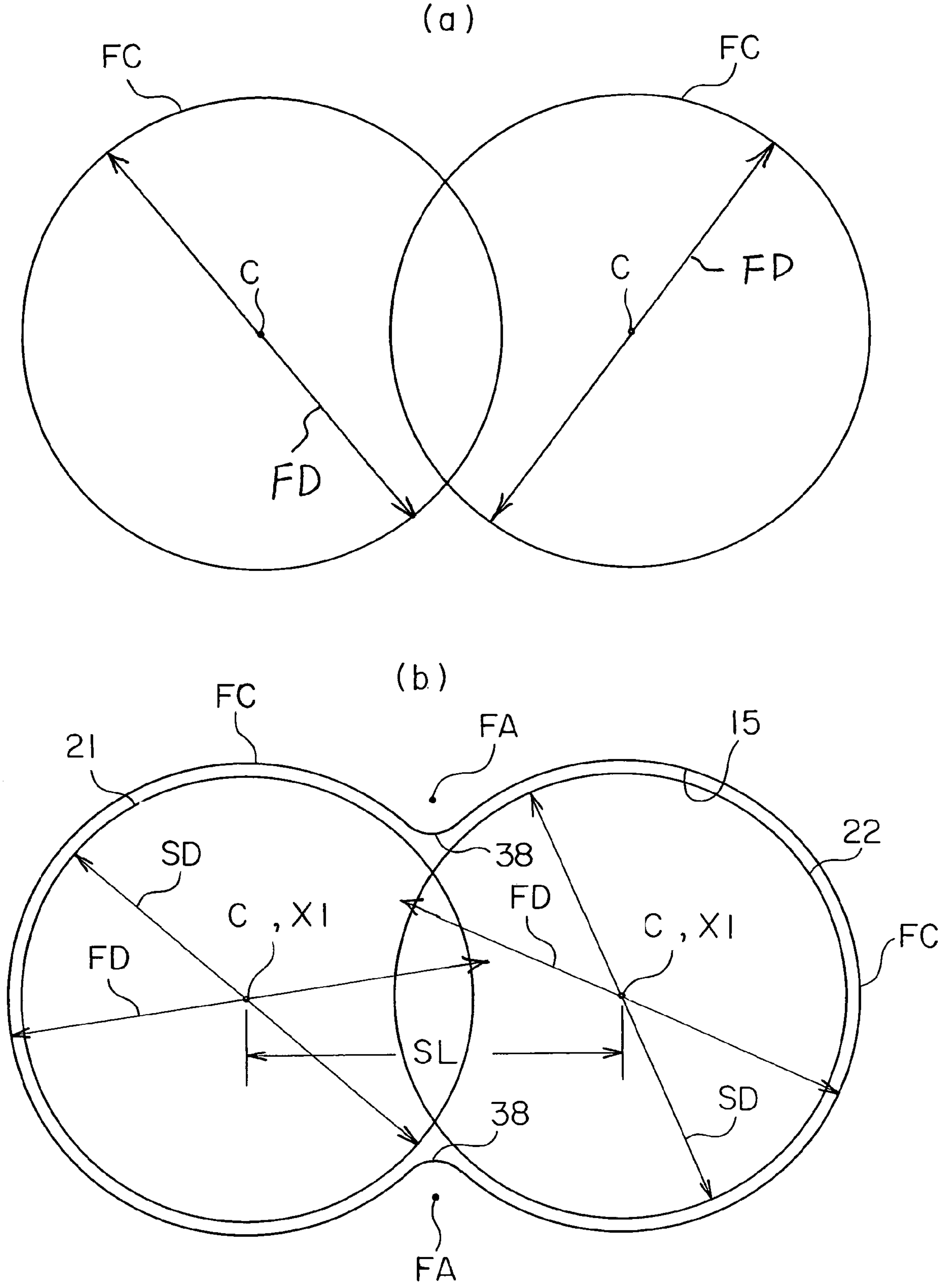
FIG. 15 is a drawing for explaining the shape of the hole of the fixed plate.

Meanwhile, the hole 15 of the fixed plate 13 is, as shown in FIGS. 15(*a*) and (*b*), in a roughly gourd-like shape defined by the outline created when two circles FC are plotted so as to overlap in part. As shown in FIG. 15(*b*), the central axes X1, X2 of the screws 21, 22 respectively pass through the center C of the circles FC, and the diameter FD of the circles FC is equal to the diameter MD of the circles MC of the movable plate 12 shown in FIG. 14. Thus the hole 15 of the fixed plate 13 of this embodiment is formed in a roughly gourd-like shape defined by the two circles FC, which are plotted so as to be concentric with the respective central axis X1, X2 of the screws 21, 22, and the diameter FD of each circle FC is set to be roughly equal to the diameter MD of the circles MC that define the hole 14 of the movable plate 12. Upon making such setting, it is preferable that the boundary 38 of both circles FC be formed with a rounded shape.

By forming the hole 14 of the movable plate 12 and the hole 15 of the fixed plate 13 as described above, material being treated present within the holes 14, 15 is effectively scraped off by the blades 25, 26 of the screws 21, 22.

Figure 16:
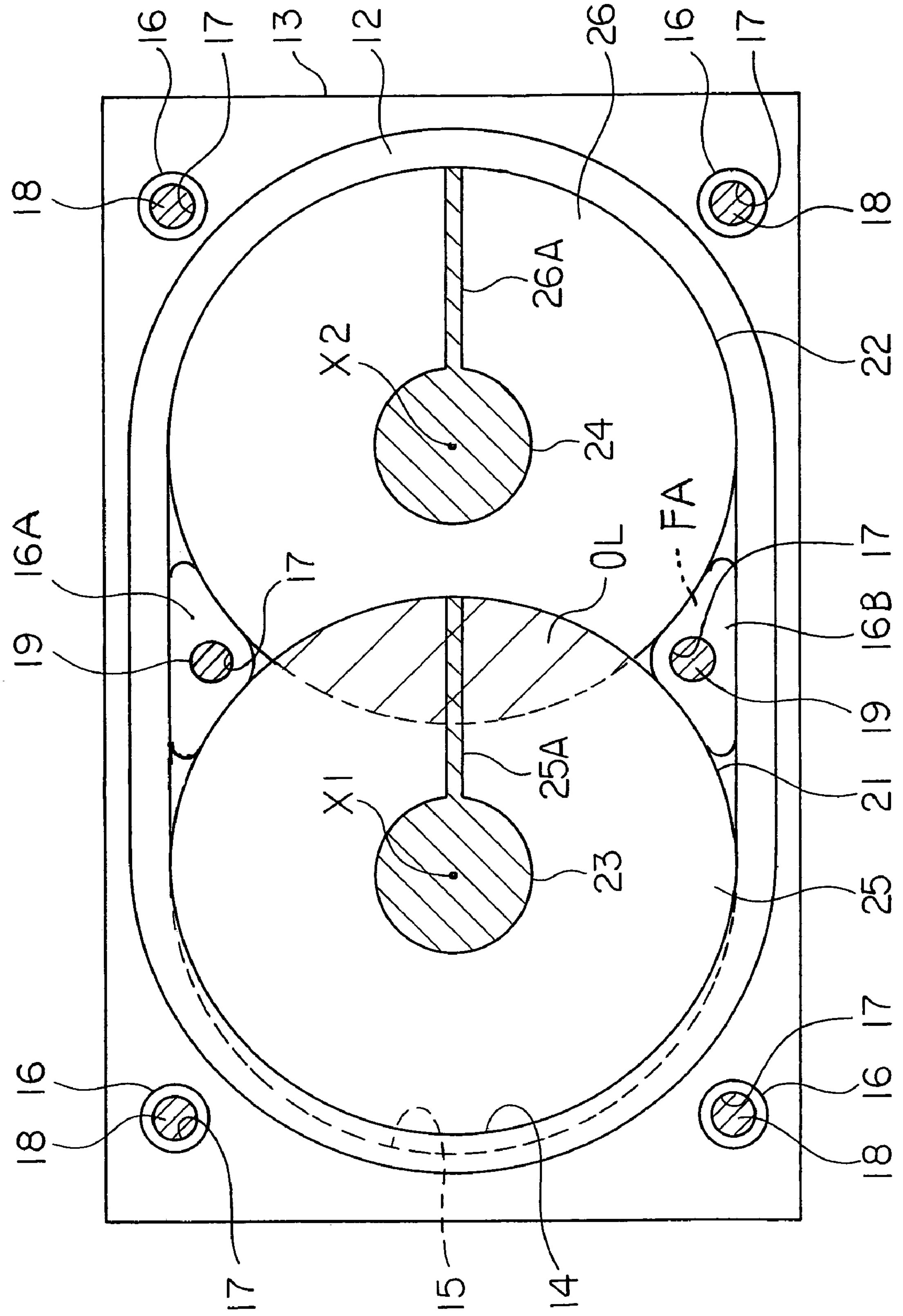
FIG. 16 is a cross-sectional view similar to FIG. 5, showing a different embodiment for a spacer.

With a solid-liquid separator as described above, as can be seen from FIGS. 7 to 13, when the movable plate 12 moves reciprocatingly in the lateral direction in the Figures, the movable plate 12 vibrates slightly in the vertical direction, with the point of contact with a spacer 16 engaged on the upper bolt 19 as fulcrum. To prevent this, as shown in FIG. 16, if the upper surface of a spacer 16A with which the upper bolt 19 engages and the lower surface of the spacer 16B with which the lower bolt 19 engages are made flat, when the movable plate 12 moves reciprocatingly in the lateral direction, the upper surface of the spacer 16A and the lower surface of the spacer 16B guide the movable plate 12; such a constitution prevents the movable plate 12 from vibrating in the vertical direction, with the point of contact with the spacer 16A as fulcrum.

Further, as shown in FIG. 15(*b*), the movable plates 12 do not pass through the area FA near the boundary 38 of the two circles FC that define the hole 15 of the fixed plate 13. For this reason, there is the danger that solid components of the material being treated will get stuck, causing clogging that prevents discharge from this area FA and reduces discharge efficiency. However, the spacer 16B shown in FIG. 16 is positioned in the area FA shown in FIG. 15(*b*), so there is no danger of solid components getting stuck here. The effluent flows downward through the gap between the spacer 16B and the fixed plate 13.

The solid-liquid separator as described above is constituted so that movable plates 12 and fixed plates 13 are alternatingly disposed and the movable plate 12 operates against the fixed plate 13; the present invention is not, however, limited to such a constitution. Alternatively, for example, the solid-liquid separator may be constituted so that fixed plates are not provided, but a multiplicity of movable plates 12 only are disposed, and two screws 21, 22 pass through the holes 14 of that multiplicity of movable plates 12, and effluent is discharged through the gaps between the movable plates 12, and so that the rotation of the screws 21, 22 causes the movable plates 12 to operate in the same manner as described earlier with reference to FIGS. 7–13, and with the operation of the movable plates 12 upon one another, the drawback of having solids get clogged therebetween is prevented.

As described above, a solid-liquid separator according to the present invention comprises a plurality of movable plates and two screws that extend through holes formed in these plates, each screw having a blade. The two screws are disposed so that their blades overlap in part. The spinning direction of the screw blades and the rotation direction of the screws are set so that all the material for treatment is transported in the same direction, and the hole of the movable plate is set to a size allowing the movable plate to be pushed and moved by the rotating blades of the two screws.

Further, in the illustrated embodiment, the tubular body 34 is disposed horizontally. However, as is public known, a solid-liquid separator may be constituted so that the tubular body 34 is inclined, with the inlet opening 34A side of the tubular body 34 disposed lower than the outlet opening 34B side, so that heavy pressure is applied to material being treated inside the tubular body as it approaches the outlet opening 34B.

I claim:

1. A solid-liquid separator for separating liquid from a material for treatment, said separator comprising:

- a plurality of movable plate, and fixed plates, each of said movable and fixed plates having a hole;
- first and second screws, each of said screws having a blade, said screws extending through said hole in said movable and fixed plates, said screws being disposed so that said blade of said first screw overlaps said blade from said second screw;
- each of said blades adapted for spinning so that said material is urged through said separator; and
- said movable plates adapted for being urged by said rotating blades;
- said screws each having an outer diameter and a center axis, said screws being mutually separated by a predetermined distance;
- said hole in each of said movable plates being an elongated hole defined by first and second circles, said circles overlapping and having substantially equal diameters, said hole diameters being larger than respective diameters of said first and second screws, said circles each having a center axis, said center axes of said circles being mutually separated by a predetermined distance, said distance between said center axes of said circles being smaller than said distance between said center axes of said screws; and
- said hole in each of said movable plates being further defined by two opposing tangents connecting said first and second circles.

2. The solid-liquid separator of claim 1, wherein said hole of said fixed plate is defined by first and second circles, said circles overlapping and having substantially equal diameters, said hole diameters being substantially the same as respective first and second circle diameters of said movable plate, said circles each having a center axis, said center axes of said circles being concentric with respective center axes of said first and second screws.

3. The solid-liquid separator of claim 2, wherein said hole of said fixed plate substantially defines a gourd shape.

4. A solid-liquid separator for separating liquid from a material for treatment, said separator comprising:

a plurality of movable of said plates, each plate having a hole;

first and second screws, each of said screws having a blade, said screws extending through said hole in said plates, said screws being disposed so that said blade of said first screw overlaps said blade from said second screw;

each of said blades adapted for spinning so that said material is urged through said separator; and said movable plates adapted for being urged by said rotating blades the solid-liquid separator further comprising:

a plurality of fixed plates, each of said fixed plates having a hole and at least two of the fixed plates being mutually adjacent;

at least one of said movable plates being disposed between said adjacent fixed plates; and said screws extending through said hole in said fixed plates;

said screws each having an outer diameter and a center axis, said screws being mutually separated by a predetermined distance;

said hole in each of said movable plates being an elongated hole defined by first and second circles, said circles overlapping and having substantially equal diameters, said hole diameters being larger than respective diameters of said first and second screws, said circles each having a center axis, said center axes of said circles being mutually separated by a predetermined distance, said distance between said center axes of said circles being smaller than said distance between said center axes of said screws; and said hole in each of said movable plates further defined by two opposing tangents connecting said first and second circles.

* * * * *